United States Patent [19]

Yumoto et al.

[11] Patent Number: 4,898,022
[45] Date of Patent: Feb. 6, 1990

[54] STEAM TRAP OPERATION DETECTOR

[75] Inventors: Hideaki Yumoto; Masao Yonemura; Mamoru Nagase; Yoshito Yamada; Yoshiyasu Fujiwara; Masakatsu Okamoto; Yasutoshi Hosokawa, all of Kakogawa, Japan

[73] Assignee: TLV Co., Ltd., Japan

[21] Appl. No.: 261,830

[22] PCT Filed: Feb. 8, 1988

[86] PCT No.: PCT/JP88/00118
§ 371 Date: Nov. 28, 1988
§ 102(e) Date: Nov. 28, 1988

[87] PCT Pub. No.: WO88/05886
PCT Pub. Date: Aug. 11, 1988

[30] Foreign Application Priority Data

Feb. 9, 1987 [JP] Japan .................................. 62-29164
Sep. 14, 1987 [JP] Japan ................................ 62-230821
Jan. 12, 1988 [JP] Japan .................................... 63-2758
Jan. 13, 1988 [JP] Japan ................................ 63-3335[U]
Jan. 13, 1988 [JP] Japan ................................ 63-3334[U]
Jan. 13, 1988 [JP] Japan ................................ 63-3333[U]
Jan. 14, 1988 [JP] Japan .................................... 63-6649
Jan. 14, 1988 [JP] Japan .................................... 63-6648

[51] Int. Cl.$^4$ .............................................. G01M 3/08
[52] U.S. Cl. ........................................... 73/46; 73/592; 236/94
[58] Field of Search ....................... 73/592, 46; 236/94

[56] References Cited

U.S. PATENT DOCUMENTS 4,727,550 3/1988 Yonemura ......................... 73/592 X
4,821,769 4/1989 Mills et al. ......................... 73/592 X

FOREIGN PATENT DOCUMENTS 109025 1/1980 Japan .

Primary Examiner—William E. Wayner
Attorney, Agent, or Firm—Kane, Dalsimer, Sullivan, Kurucz, Levy, Eisele and Richard

[57] ABSTRACT

A steam trap operation detector provided with a vibration detecting section and a arithmetric section. The detecting section includes a probe, a diaphragm for generating ultrasonic vibration in response to mechanical vibrations sensed by the probe and a vibration sensor for converting the ultrasonic vibration into an electrical signal. The detector also includes an arthimetric section for receiving an amplified signal from the vibration sensor and processing the same into information indicative of the operation of the steam trap.

9 Claims, 9 Drawing Sheets

STEAM TRAP OPERATION DETECTOR

FIELD OF THE INVENTION

The present invention relates to operation detectors for judging whether the operating condition of steam traps used in steam systems at steam appliances, such as a steam-motive electric power plant, a chemical plant, a manufacturing equipment, and the like, is good or not.

BACKGROUND TECHNIQUES

Generally, steam traps are provided at suitable places of steam lines or steam appliances for the purpose of automatically exhausting condensed water without passing steam. In the case where such steam traps do not operate normally, there will occur a serious trouble in the activities of steam appliances by failure of steam transportation or by occurrence of steam loss. More particularly, in the case where the exhaust capacity of steam traps attached to steam appliances is less than the quantity of condensed water, or in the case where the condensed-water exhausting function of steam traps deteriorates or is lost so entirely that the valve opening function thereof can not operate, the condensed water will remain in the entrance piping of the steam traps, so that a phenomenon of water hammer will often appear or the efficiency of the steam appliances will be often lowered to cause breakage in extreme case. On the contrary, in the case where the valve closing function of the steam traps is unsatisfactory, it will be apparent that steam leakage increases to thereby cause inconvenience of lowering of efficiency with the shortage in pressure and quantity of the steam and to thereby cause waste of expensive energy undesirably.

As an example of apparatus for detecting steam leakage at a steam valve such as a steam trap or the like, a steam leakage detector has been disclosed in Japanese Utility Model Unexamined Publication No. 58-187739. The steam leakage detector detects vibration in a valve body of a steam valve from the outside of the steam valve to thereby judge presence of steam leakage. The principle of detection in the steam leakage detector is in that a probe provided at the top end of the detector is brought into contact with the steam valve or the like to be detected so that vibration generated in the probe is converted into an electric signal by an ultrasonic microphone using a piezoelectric element, and then the electric signal is amplified and led to a display unit or a speaker to drive the display unit or the speaker.

According to this prior art apparatus, deflection of an indication pointer actuated by the vibration detected by the probe is read or sound from the speaker is listen to recognize the level of vibration, and hence the presence and degree of steam leakage. However, the apparatus has a disadvantage in that steam leakage can not be grasped quantitatively. This is because vibration generated in a valve, such as a steam trap or the like, varies widely with various factors, such as for example the structure and size of the valve, the ratio of steam to condensed water, and the like, though the deflection of the indication pointer or the output of the speaker is proportional to the vibration detected by the probe.

DISCLOSURE OF THE INVENTION

Technical Problems that the Invention is to solve

An object of the present invention is to provide a steam trap operation detector in which vibration generated in a steam valve, such as a steam trap or the like, can be grasped exactly and quantitatively by reference to preliminarily stored data as to kinds, sizes, and the like.

Another object of the invention is to provide a steam trap operation detector in which vibration owing to a flow of steam can be detected with distinction from vibration owing to a flow of condensed water by the detection on consideration of steam temperature within the steam trap.

A further object of the invention is to provide a steam trap operation detector in which the presence of steam leakage can be exactly grasped with eliminating an influence based on variations in steam pressure within the steam trap. The steam pressure may be manually established by the user or may be automatically computed from the measured temperature.

A still another object of the invention is to provide a steam trap operation detector in which wide-range vibration generated in a steam trap can be detected efficiently.

A still further object of the invention is to provide a steam trap operation detector in which influence of externally transmitted vibratory noise is eliminated so that vibration generated in a steam trap can be detected with no error.

Technical Means for Solving the Problems

The steam trap operation detector according to the present invention comprises a vibration detecting section and an arithmetic section. The vibration detecting section includes a probe having one end which is shaped so as to be able to contact with an object to be detected with a predetermined pressure and the other end on which a vibration sensor for converting mechanical vibration into an electric signal is provided, and the arithmetic section is arranged to compare the signal transmitted from the vibration detecting section with storage data selected from necessary data stored in a memory so as to compute a steam leakage quantity of the object to be detected to thereby generate an output for the purpose of judging whether the operating condition of the object to be detected is good or not on the basis of the result of computation.

The steam trap operation detector according to the invention can store data of the relation between the steam leakage quantity and the vibration level as storage data corresponding to the variations in construction, nominal size, etc. of the object to be detected.

The steam trap operation detector according to the invention can store data as to the relation between the steam leakage quantity and the vibration level as storage data corresponding to the variations in steam pressure of the object to be detected.

In the steam trap operation detector according to the invention, a temperature sensor may be additionally provided at the top end of the probe in order to discriminate the fluid material within the object to be detected on the basis of the temperature range thereof.

In the steam trap operation detector according to the invention, the temperature sensor may be attached at the top end of the probe through a heat insulator in order to eliminate the influence of heat radiation.

In the steam trap operation detector according to the invention, the probe may be formed so as to have a pointed top end for the purpose of eliminating an error in detection due to the variations in heat conduction.

The steam trap operation detector according to the invention may include diaphragm means having a plurality of resonant points for the purpose of detecting the vibration of a variety of objects to be detected which are different in construction, size, etc. from each other.

The steam trap operation detector according too the invention has a structure for reducing the transmission of vibration from the body of the detector or the outside thereof in order to detect the vibration of the object to be detected exactly.

Effects of the Invention

According to the present invention, an arithmetic section is operated while a probe is brought into contact with an object to be detected with predetermined pressure, so that it is possible to detect presence and degree of steam leakage exactly with good reproducibility and it is possible to eliminate any error owing to the user in judgment as to whether the operating condition of the object to be detected is good or not. Further, the judgment can be made more exactly by preliminarily selecting stored data in accordance with the distinction in construction, nominal size, steam pressure, etc. of the object to be detected.

Further, according to the invention, whether the fluidity is of only condensed water or of a mixture of steam and condensed water can be judged more exactly by additionally detecting the temperature of the object to be detected. Further, any error in detection due to the use condition or individual difference of the user can be eliminated by improving the attaching structure of the temperature detecting sensor and the structure of the probe.

Furthermore, according to the invention, the detector can cope, as it is, with variations in vibration depending on variations in kind and use condition of the object to be detected, by provision of a diaphragm resonant with a plurality of vibrations for transmitting vibration to a vibration sensor.

In addition, according to the invention, accuracy in detection of vibration or in other words accuracy in judgment of the operating condition of the object to be detected can be improved by eliminating unnecessary vibration transmission passage to a vibration sensor to the utmost.

BEST MODES FOR EXECUTION OF THE INVENTION

Figure 1:
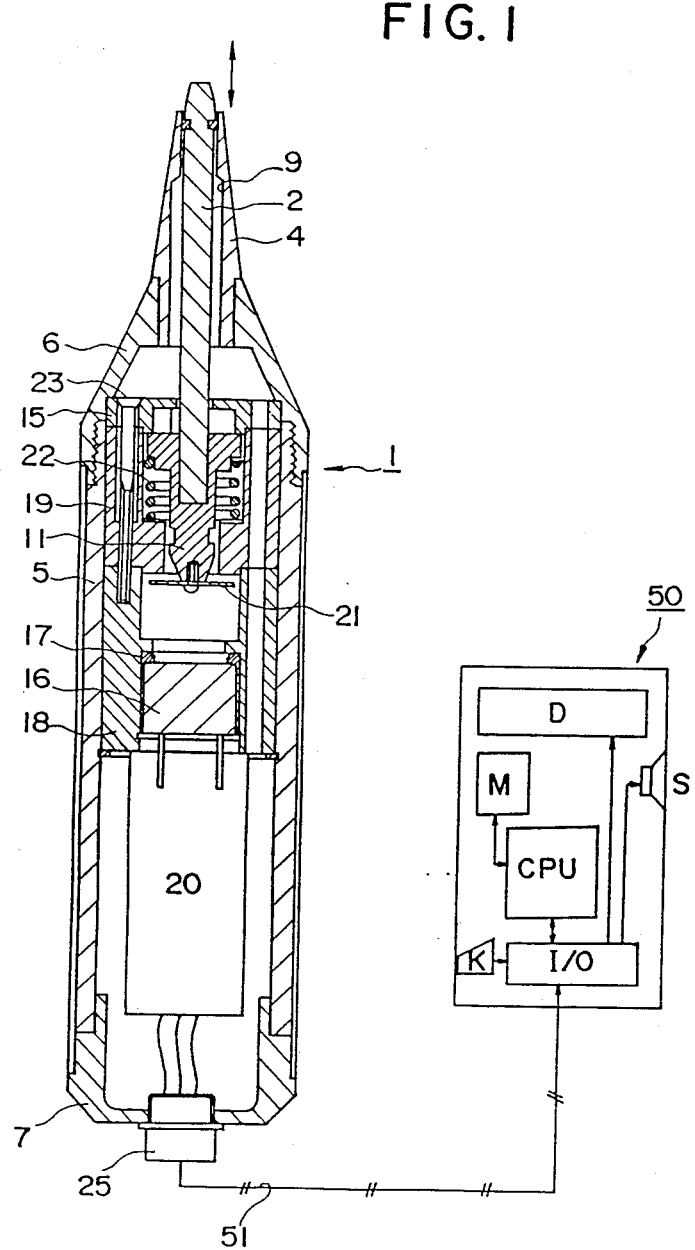
FIG. 1 is a longitudinal section and an electrical block diagram showing a construction of the steam trap operation detector according to the present invention.

Referring to FIG. 1, there is shown the whole construction of the steam trap operation detector according to the present invention. The steam trap operation detector is constituted by a detecting section 1, and an arithmetic section 50. The detecting section 1 and the arithmetic section 50 are electrically connected to each other through a cable 51.

The detecting section 1 has a probe 2 arranged to be slidable as shown by the double-headed arrow in FIG. 1, a probe holding member 4 arranged to enclose the probe 2, a body 5, a front cover 6 for connecting the holding member 4 to the body 5, and a rear cap provided with a port 25 for leading out a cable 51. A substantially cylindrical inside space is defined by the front cover 6, the body 5 and the rear cap 7, and in the thus defined inside space there are provided vibration detecting elements including a diaphragm holding plate 15 for holding a diaphragm 11, a microphone holder 18 for holding an ultrasonic microphone 16 as a vibration sensor through an O-ring 17, a spring holder 19 for holding a coiled spring 22 for urging the probe 2 forward, and a circuit board 20, including amplifying, for electrically processing the electric signal converted by the ultrasonic microphone 16 to thereby output the processed signal. The probe holding member 4 has an upper conical portion and a lower cylindrical portion. A longitudinal hole 9 is formed through the upper conical portion, and the probe 2 is urged forward by the spring 22 so that the top end of the probe 2 normally projects from the top end of the hole 9. The probe 2 is arranged so as to be slidable backward to a position where the top end thereof is registered with the top end of the holding member 4, when urging force is exerted on the top end of the probe 2. The probe 2 is formed so that the top end thereof can be brought into contact with an object to be detected (not shown), and that the rear end thereof can be pressed into a diaphragm mounting member 11 so as to be integrated therewith.

A diaphragm 21 is fixed to the diaphragm mounting member 11 at the opposite side to the probe by a screw or any other suitable means. The ultrasonic microphone 16, as a vibration sensor, is provided to face the diaphragm 21. The output terminal of the ultrasonic microphone 16 is connected to the circuit board 20 containing an amplifying circuit and other necessary circuits. The holding plate 15, the spring holder 19 and the microphone holder 18 are connected to each other by a screw 23.

The arithmetic section 50 has an input-output interface I/O, a central processing unit CPU, a memory M, a key-input unit K, a display unit D, and a speaker S. According to the purposes of use, a printer unit P for printing the result of computation, and a function for transferring computed data to a host computer or the like may be additionally provided in the section 50.

Figure 2:
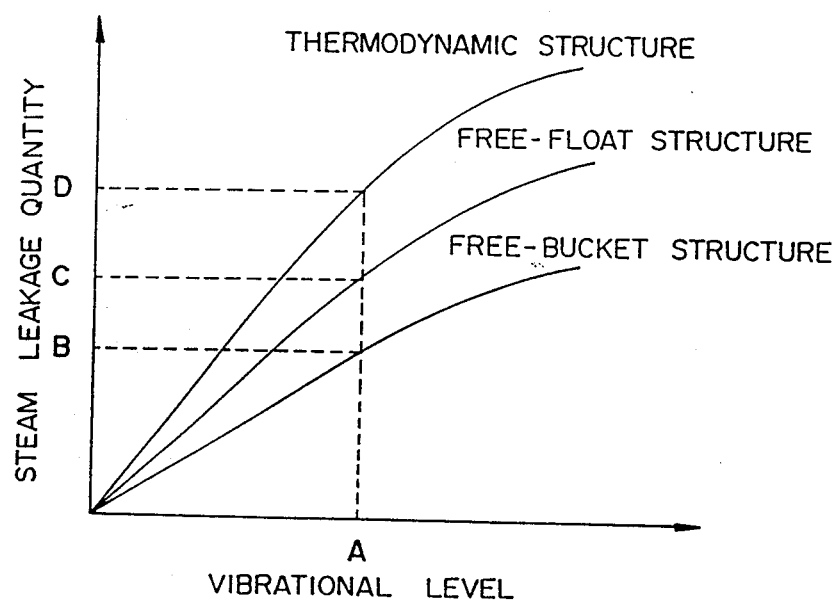
FIG. 2 is a characteristic curve graph showing the relation between the vibration level and the steam leakage quantity on the basis of variations in construction of steam traps.

The relation between vibration levels and steam leakage quantities corresponding to variations in construction and size of a variety of steam traps can be stored in the memory M in the arithmetic section 50. FIG. 2 is a characteristic curve graph with the vibration level as the abscissa and the steam leakage quantity as the ordinate, with variations in construction of various steam traps as a parameter. As shown in FIG. 2, the respective steam traps are different in leakage quantity even though they are in one and the same vibration level A. More specifically, even if all the steam traps are in one and the same vibration level A, the leakage quantity in the steam trap having a free-bucket structure may be B, the leakage quantity in the steam trap having a free-float structure may be C, and the leakage quantity in the steam trap having a thermodynamic structure may be D. Accordingly, the relation between the steam leakage quantity and the vibration level preliminarily measured corresponding to the distinction in construction, size, steam pressure, etc. of the steam traps is stored in the memory M, and then necessary conditions, such as the kind of the steam trap, the construction thereof, the steam pressure used in the steam trap, and the like, are set through the keyinput unit K, so that the central processing unit CPU can perform computation exactly at the time of leakage detection.

The operation of the aforementioned detector is as follows. The top end of the probe 2 of the detecting section 1 is brought into contact with the object to be detected, so that mechanical vibration existing in the target is transitted to the diaphragm mounting member 11 to thereby cause the diaphragm 21 vibrate. The vibration of the diaphragm 21 is propagated in the space within the microphone holder 16 so as to be converted into an electric signal by the ultrasonic microphone 16 disposed in opposition to the diaphragm 21. The electric signal is suitably amplified by the circuit board 20 and then transmitted to the arithmetic section 50 through the cable 51. Receiving an input signal proportional to the detected vibration level and transmitted from the detecting section 1 to the arithmetic section 50 through the cable 51, the central processing unit CPU performs computation on the basis of the set conditions so as to actuate the display unit D and/or speaker S on the basis of the result of computation. The result of computation has been obtained through processing by making reference to the predetermined data preliminarily stored in the memory M. Accordingly, because a true vibration level is exactly expressed on consideration of the distinction in construction, size, use condition, etc. of the object to be detected, the result is always suited to the conditions.

Figure 3:
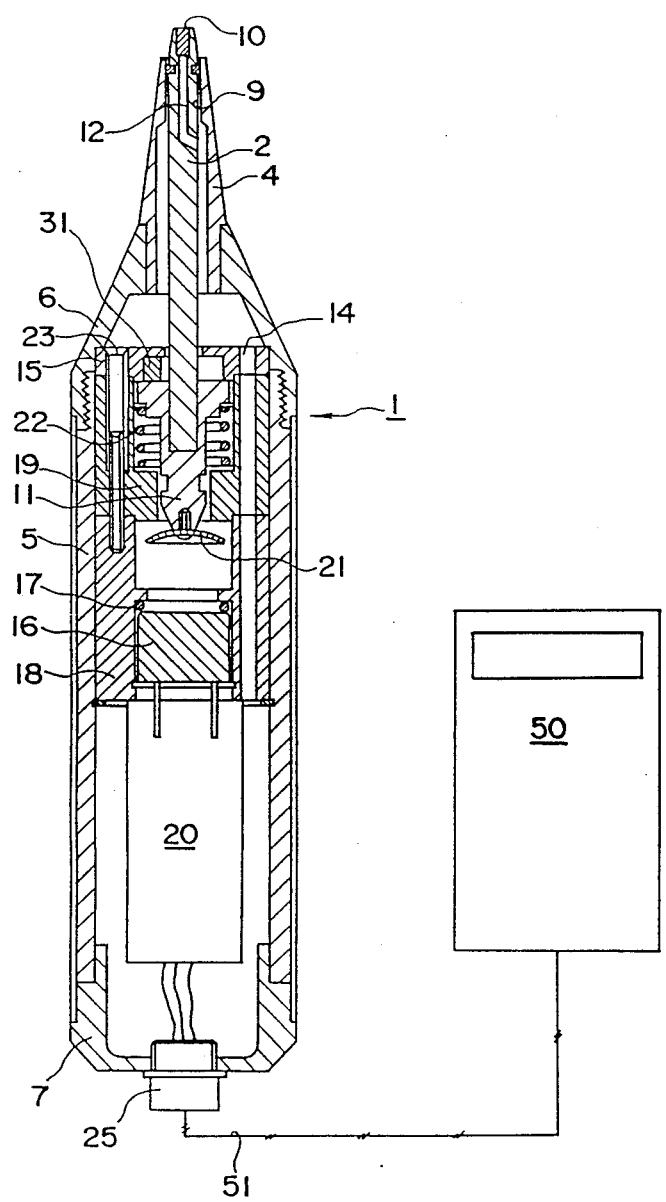
FIG. 3 is a longitudinal section and an electrical block diagram showing another construction of the steam trap operation detector according to the present invention.

FIG. 3 shows another embodiment of the structure according to the present invention. In FIG. 3, the same parts as those in FIG. 1 are correspondingly referenced. The different point from FIG. 1 is in that: a temperature sensor 10 is provided at the top end of the probe 1; a hole 12 for insertion of lead wire of the temperature sensor 10 is formed in the top end portion of the probe 1; and a microswitch 31 is disposed in the holding member 15. According to the construction of FIG. 3, it is possible to judge whether the leakage in the steam trap is of only condensed water or of a mixture of condensed water and steam. According to the steam trap operation detector of the present invention, the temperature as well as the mechanical vibration of an object to be detected can be detected. Detection of temperature of the steam trap brings the following effect. Generally, steam traps are classified in accordance with the operational principle thereof into of the mechanical type using the specific weight difference between steam and condensed water, of the thermodynamic type using the thermodynamic characteristic difference between steam and condensed water, of the thermostatic type using the temperature difference between steam and condensed water, and of the temperature adjusting type in which condensed water having a temperature lower than a predetermined temperature is exhausted. Of the variety of steam traps, in those of the mechanical type, of thermodynamic type and of the thermostatic type, the temperature is lower than the saturated steam temperature by several degrees (°C.) or tens of degrees (°C.) in the case where condensed water is exhausted normally. Accordingly, in the case where the steam trap is short in capacity, in the case where the condensed-water exhausting function of the steam trap becomes abnormal or perfectly broken down, or the like, condensed water remains in the upstream of the steam trap. Therefore, in such cases, the temperature of the steam trap becomes lower than that in the case where condensed water is being exhausted normally. In this viewpoint, in the embodiment, the temperature of the steam trap as an object to be detected is detected by the temperature sensor provided at the top end of the probe 2 in this embodiment to make it possible to detect the operating condition including lowering of the condensed-water exhausting function through judgment executed in the arithmetic section 50 on the basis of the detected temperature. On the other hand, the microswitch 31 is used in such a manner that when the top end of the probe 2 is brought into sufficient contact with the object to be detected so that the diaphragm holding member 11 exceeds a predetermined distance, or in other words, when preparation for measurement has been completed, the microswitch 31 is actuated to turn on the electric source for the detecting section and arithmetic section. The lead wire from the contact of the microswitch 31 is connected to the circuit board 20 so that the electric source system not shown can be automatically switched on and off.

According to the construction of FIG. 3, not only the operation of steam traps can be detected in the same manner as described above for the construction of FIG. 1, but the temperature data of steam traps in the operating condition can be obtained by the temperature sensor 10 so that the judgment of the operating condition inclusive of the condensed-water exhausting function can be made more exactly. It will be apparent that the arithmetic section 50 may have a function of comparing the temperature data obtained by the temperature sensor 10 with a reference value for the purpose of judgment, as well as well-known attendant functions, such as a displaying function, an alarming function and the like.

Further, the deterioration of the condensed-water exhausting function can be detected more accurately by inputting the used steam pressure through the key-input unit and establishing the reference temperature on the basis of the saturated steam temperature. Further, in the case where the object to be detected is a steam trap of the temperature adjusting type, the deterioration of the condensed-water exhausting function can be detected exactly by setting the reference temperature to be lower than the preliminarily set temperature of the exhaust condensed water so that condensed water of the range lower than the set temperature can be exhausted.

Figure 4:
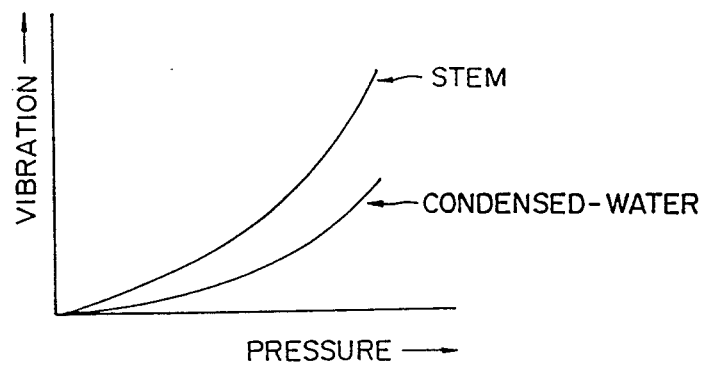
FIG. 4 is a characteristic curve graph showing the amplitude condition of vibration owing to the flow of steam and condensed water.

As described above, if the temperature of an object to be detected is measured by the temperature sensor 10 provided at the top end of the probe 2, the saturated pressure of internal steam can be known. The relation between such pressure and amplitude of vibration is shown in FIG. 4. Accordingly, the presence or magnitude of a steam flow or a condensed-water flow can be known by the vibration corresponding to the value of pressure reduced from the temperature detected by the temperature sensor. Also in this case, storage of necessary data and computation based on the storage data are automatically executed by the arithmetic section 50.

Figure 5:
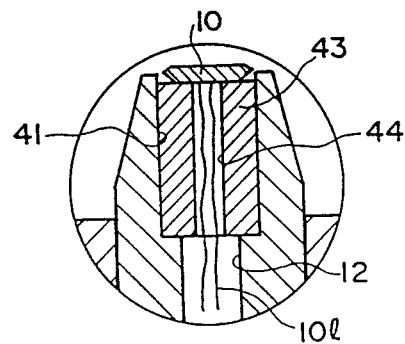
FIG. 5 is a longitudinal sectional view showing the construction of the top end of the probe in the steam trap operation detector according to the present invention.

FIG. 5 shows a modification of the present invention, improved in arrangement of the temperature sensor which is disposed at the top end of the probe as shown in FIG. 3. As described above, the addition of the temperature detecting function to the vibration detecting function preferably brings improvement of detecting accuracy and increase of detection items. However, the probe is, in most cases, formed of a heat-conductive material, such as stainless steel or the like. Accordingly, when the temperature of the temperature sensor 10 is raised up by heat conduction from the object to be detected, heat conduction occurs also through the probe, so that the temperature rising in the temperature sensor itself becomes unstable. In this viewpoint, the subject of this embodiment is in that a tube-like heat insulator 43 of a suitably selected material is fitted into a concavity 41 formed in the top end of the probe 4 so that the temperature sensor 10 is disposed at the top of the tube-like heat insulator. The temperature sensor 10 is arranged to project slightly from the top end of the probe 4. Lead wire 10l of the temperature sensor 10 is led to the circuit board not shown, through a hole 44 of the heat insulator 43 and the hole 12 of the probe 4. The heat insulator 43 must have the characteristic of transmitting mechanical vibration sufficiently. Preferably, a ceramic tube is used as the heat insulator 43 for the purpose of fulfilling the heat-insulating effect while transmitting vibration in the same manenr as a metal material.

Figure 6:
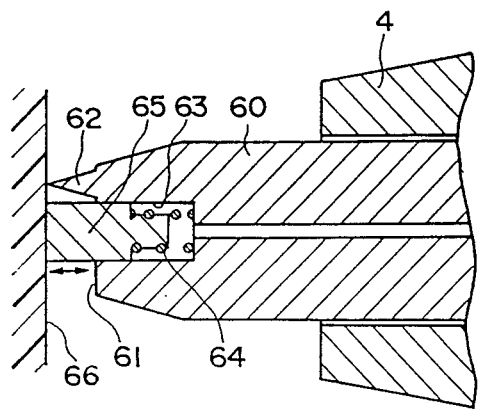
FIGS. 6 and 7 are longitudinal sectional views showing the construction of the top end of the probe in the steam trap operation detector according to the present invention.
Figure 7:
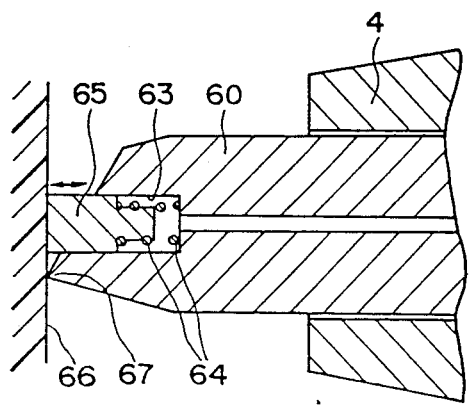

FIGS. 6 and 7 shows modifications of the present invention, which are improved in the structure of the top end of the probe. According to the construction of the probe in the aforementioned operation detector, the detected vibration level often changes depending on the contacting condition with the object to be detected. Although the probe is designed to be continuously pressed forward for the purpose of avoiding individual difference due to the users, the same contacting condition can not always be attained because the surface of the object to be detected is, in most cases, curved. Further, the contacting condition often changes by the distinction in the peculiar way of the users. Accordingly, there arises a difference in detection of vibration between the case where the probe is in place contact with the object to be detected and the case where the probe is in point contact with the object to be detected. Such a difference in detection of vibration brings about an error in fundamental data to be computed, resulting in undesirable misjudgment. In the modification of FIG. 6, in order to avoid such undesirable misjudgment, a projection 62 is formed at the top end 61 of a probe 60 longitudinally inserted through the hole of the probe holding member 4. Further, a temperature sensor 65 continuously pressed forward by a spring 64 is attached to a concavity 63 formed at the top end of the probe 60. According to this construction, the probe is continuously in point contact with an object 66 to be detected, so that substantially uniform measurement of vibration can be made, irrespective of the external form of the object 66 to be detected and the peculiar way of the user. In this case, contact sufficient to detect the temperature can be made because the temperature sensor 65 is urged against the object 66 to be detected by the spring 62, but vibration is little transmitted because it is absorbed by the spring 62.

FIG. 7 shows a second form in which the top end of the probe is modified. The construction of FIG. 7 is similar to that of FIG. 6, except that a projection 67 is formed by cutting the top end of the construction of FIG. 6 so as to be inclined. The construction of FIG. 7 can be formed easily by working.

Figure 8:
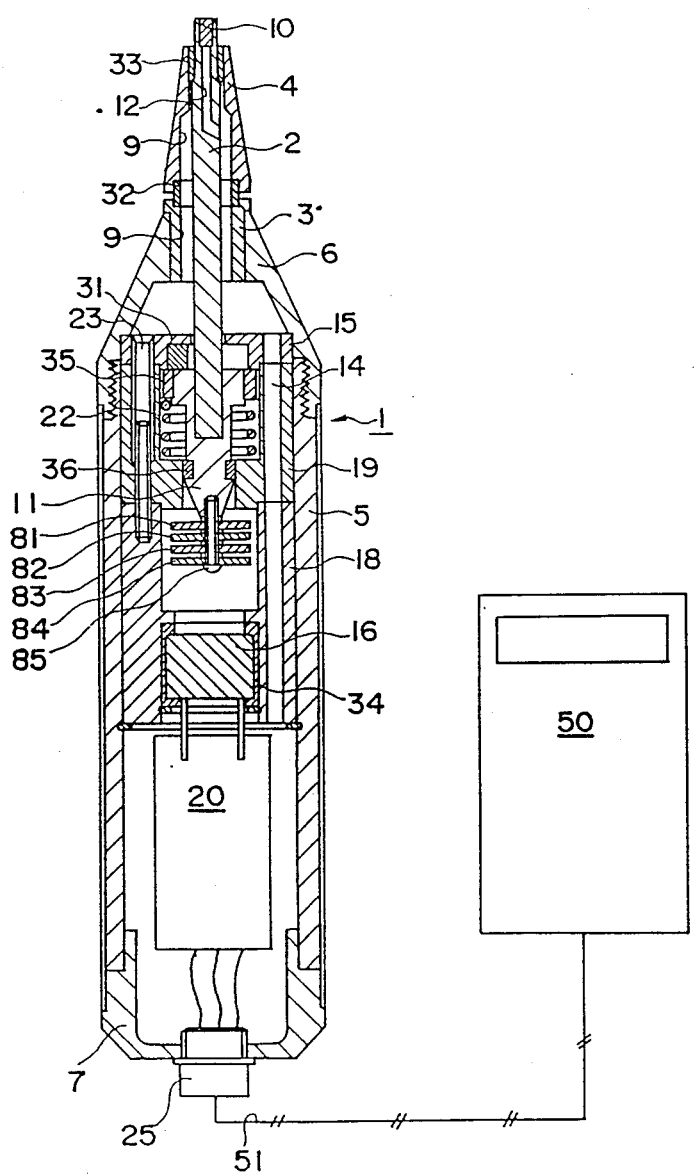
FIG. 8 is a longitudinal section and an electrical block diagram showing a further construction of the steam trap operation detector according to the present invention.

FIG. 8 shows a modification of the present invention, which is improved in structure of the diaphragm for converting mechanical vibration detected by the probe into an ultrasonic wave. Each of a series of operating condition detectors described above in the foregoing embodiments has a single resonant point because a single diaphragm is used. It is generally known that the sensitivity of the diaphragm is large in the vicinity of its resonant frequency (resonant point) but very small in the other points. In the case where the operating condition of steam traps is detected on the basis of the magnitude of vibration, it is necessary to attach a diaphragm preliminarily suitably selected on the assumption of the frequency of vibration which will be generated or to prepare several kinds of detecting sections corresponding to the variations in vibration frequency, because the vibration generated owing to the steam current or condensed-water current of steam traps can be specified in accordance with the distinction in construction, size, etc. of the steam traps. According to the construction of FIG. 8, a plurality of diaphragms 82 to 84 are fixed to the rear of the probe holding member 11 by a screw 85 along the axis of the probe 2. In FIG. 8, the same parts as those in FIGS. 1 and 3 are correspondingly referenced. An elastic member 32 formed of synthetic rubber is interposed between the probe holding member 4 and the front cover 6, An elastic member 33 of the same material is interposed in the hole 9 and between the probe 2 and the probe holding member 4. Similarly, an elastic member 34 surrounds the ultrasonic microphone 16. Further, elastic members 35 and 36 are provided at two places in the outside of the diaphragm mounting member 11. The respective elastic members 32 to 36 are used for the purpose of absorbing undesirable vibratory noise which is caused by vibration generated by parts other than the object to be detected and which is given to any one of the vibration detecting members, that is, the probe 2, the diaphragm mounting member 11, the diaphragms 81 to 84, and the ultrasonic microphone 16.

Figure 9:
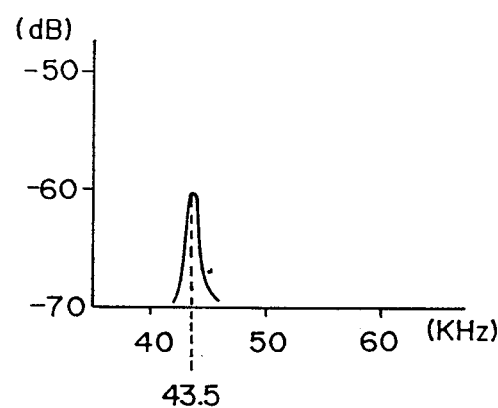
FIGS. 9 and 10 are characteristic curve graphs showing the relation between the ultrasonic frequency and vibration level.
Figure 10:
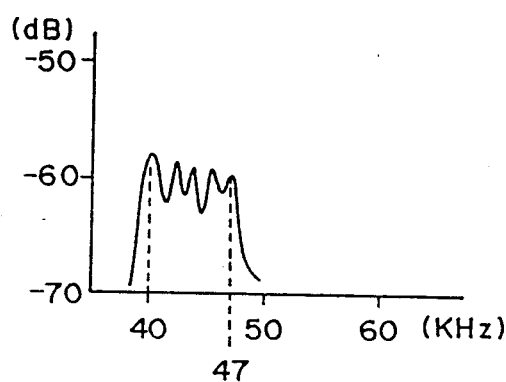

In the construction of FIG. 8, the distance between the diaphragm mounting member 11 and the ultrasonic microphone 16 was selected to be 9.19 mm. In this embodiment, four diaphragms each having a thickness of 0.9 mm and an external diameter of 15 mm were used, and attached to the diaphragm mounting member 11 with spacers each having a thickness of 0.4 mm and an external diameter of 4.5 mm and interposed between adjacent diaphragms. In the case where the distance between the diaphragm mounting member 11 and the ultrasonic microphone 16 was selected to be 9.19 mm, and only one diaphragm having a thickness of 0.3 mm and an external diameter of 15 mm was attached to the diaphragm mounting member 11, the resonant frequency was 43.5 kHz as shown in FIG. 9. On the contrary, in the case where the four diaphragms 81 to 84 as described above were used, the resonant frequency could be extended to a range of from 40 kHz to 47 kHz as shown in FIG. 10. Accordingly, the vibration of steam traps within the resonant frequency range can be detected in high sensitivity by one and the same detecting section. It is a matter of course that modifications or changes in the number and size of the diaphragms may be made and that various detecting sections different in resonant frequency range can be formed by such modifications or changes.

Figure 11:
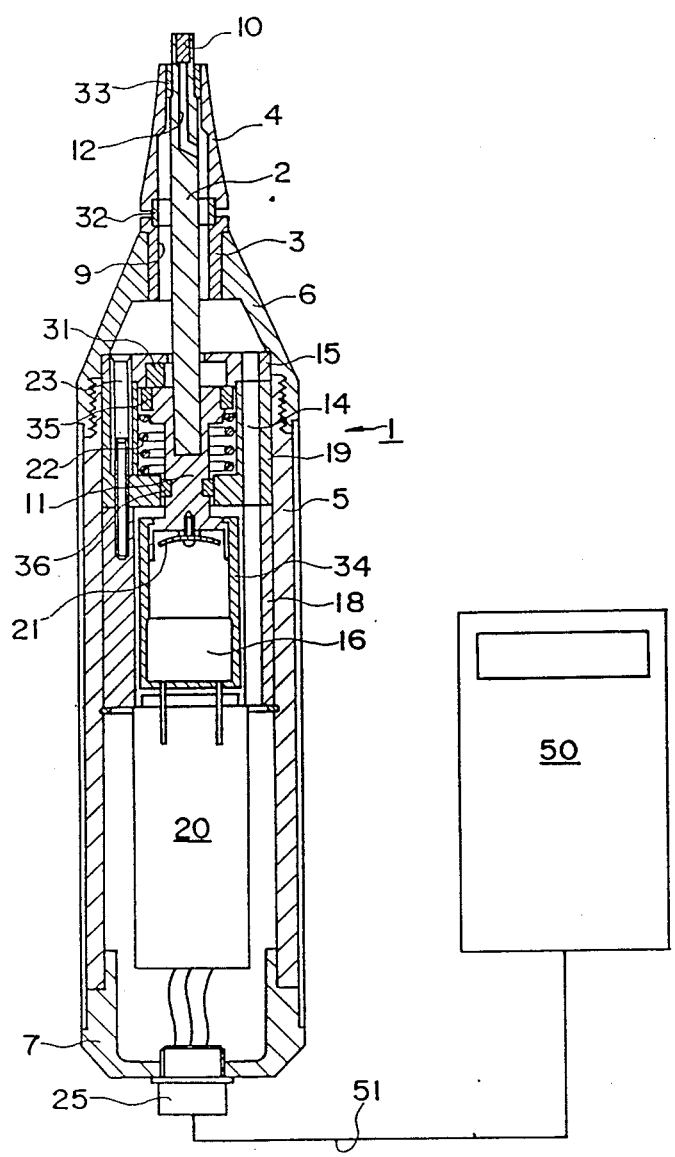
FIGS. 11 and 12 are longitudinal sections and electrical block diagrams respectively showing further constructions of the steam trap operation detector according to the present invention.

FIG. 11 shows a further embodiment of the present invention. In the aforementioned embodiments, the influence of vibration transmitted to the ultrasonic microphone 16 through the body of the detecting section 1 was more or less exerted. Therefore, elastic members as shown in FIG. 8 were provided at several places. In this embodiment, the ultrasonic microphone 16 and the diaphragm 21 are separated so as to be an opposition to each other at a predetermined distance therebetween, and the two members and the distance therebetween are enclosed by an elastic member 34' and fixed to the lower end of the diaphragm mounting member 11. According to this embodiment, vibration from the body 5 and other parts is not transmitted to the ultrasonic microphone 16 which finally detects vibration and converts the detected vibration into an electric signal. Accordingly, vibration detection having less error can be executed. The output of the ultrasonic microphone 16 is connected to the circuit board 20. According to this embodiment, the vibration detected by the probe 2 can be efficiently transmitted to the diaphragm 21 and converted into an electric signal by the ultrasonic microphone 16, so that exact measurement of vibration or in other words exact judgment of the operating condition of steam traps can be made.

Figure 12:
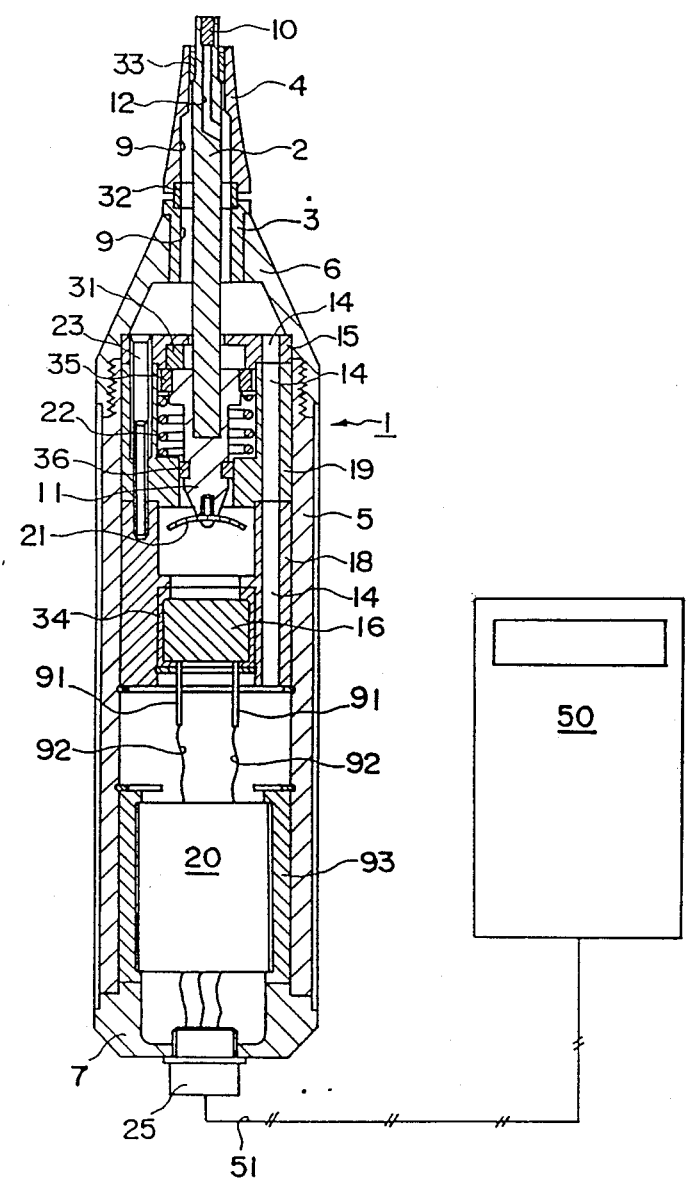

FIG. 12 shows a still another embodiment of the present invention, which is improved in the arrangement of the ultrasonic microphone 16 and the diaphragm 21 and in the connection thereof to the circuit board 20 in the construction of FIG. 11. In FIG. 12, the distance between the ultrasonic microphone 16 and the circuit board 20 is enlarged more sufficiently, so that the two are flexibly connected through lead wire 92 such as soft electrically-conductive wire. Generally, vibration applied to the body 1 from the outside is transmitted to the circuit board 20 containing an amplifying circuit so that the vibration is transmitted to the ultrasonic microphone 16 through the stiff connection pin of the ultrasonic microphone, whereafter the vibration is superposed on vibration transmitted via the space from the diaphragm 21 as the original passage so that the thus superposed vibration is converted to an electric signal. As the result, an error may arise in the output. This embodiment is arranged to avoid such situation. According to this embodiment, the circuit board 20 is attached to the body 5 by a holding member 93 formed of an elastic material, such as synthetic rubber or the like to thereby prevent the propagation of vibration from the outside, and further, the circuit board 20 and the ultrasonic microphone 16 are electrically connected through the soft conductive wire 92 to thereby prevent the transmission of the outside vibration to the ultrasonic microphone 16 securely. Consequently, the output proportional to the true vibration transmitted from the probe 2 is transmitted to the arithmetic section 50 to thereby improve the accuracy in detection.

INDUSTRIAL FIELD OF UTILIZATION

The steam trap operation detector according to the present invention relates to an operation detector for detecting the operating condition of steam traps used in a steam system at steam appliances, such as a steam-motive electric power plant, a chemical plant, a manufacturing equipment, or the like. The steam trap operating condition detector is used for detection of breakdown places in case of occurrence of abnormality as well as in daily checking and maintenance of steam traps indispensable to the aforementioned plant and equipment. Particularly, the detector according to the present invention is superior in accuracy in detection to the conventional detector. Accordingly, the functional deterioration of steam traps can be detected in the earlier stage to thereby prevent serious accidents, improve operating efficiency on the whole of such equipment, and prevent the waste of expensive energy.

We claim:

1. A steam trap operation detector comprising a detecting section (1) and an arithmetic section (50);
    said detection section (1) including:
    a probe (2) arranged to be brought into contact with an object to be detected with a predetermined pressure given by an elastic member for detecting mechanical vibration owing to a steam current and a condensed-water current within said object to be detected;
    diaphragm means (21) for generating ultrasonic vibration in response to said mechanical vibration detected by said probe (2);
    a vibration sensor (16) provided in opposition to said diaphragm means (21) for converting said ultrasonic vibration into an electric signal;
    a circuit board (20) containing an amplifying circuit for amplifying an output signal of said vibration sensor (16) so as to transmit the amplified output to the outside;
    said arithmetic section (50) including;
    a memory (M) for storing data corresponding to a variety of steam traps inclusive of said object to be detected;
    a central processing unit (CPU) for performing computation while executing comparison between the output signal transmitted from said detecting section (1) and predetermined data selectively obtained from said data stored in said memory (M); and
    output units (D; S) for displaying the result of computation of said central processing unit (CPU) and/or for generating a sound output of an audible frequency.

2. A steam trap operation detector according to claim 1, in which said memory (M) included in said arithmetic section (50) has data stored therein corresponding to distinction in construction of said variety of steam traps, so that a result corrected in accordance with distinction in kind of said object to be detected is computed out.

3. A steam trap operation detector according to claim 1, in which said memory (M) included in said arithmetic section (50) has data stored therein corresponding variations of steam pressure within steam traps, so that a result corrected in accordance with steam pressure used in said object to be detected is computed out.

4. A steam trap operation detector according to claim 1, in which a temperature sensor (10) is disposed at a top end portion of said probe (2) which is to be brought into contact with said object to be detected so that a temperature of said object to be detected is detected so as to generate an electric output corresponding to the detected temperature, and in which temperature data are preliminarily stored in said memory (M) in said arithmetic section (50), whereby whether the operation of said object to be detected is good or not is judged on the basis of comparison between an output of said temperature sensor (10) and predetermined data selectively obtained from said temperature data stored in said memory (M).

5. A steam trap operation detector according to claim 4, in which said temperature sensor (10) is attached in a concavity (41) of said probe (2) through a heat insulator (43) for preventing heat conduction without influence on transmission of vibration through said probe (2).

6. A steam trap operation detector according to claim 4 or 5, in which a pointed-end projection (62, 67) is formed at the top end of said probe (2) and a concavity (63) is formed at a position lower than said pointed-end projection, so that said temperature sensor (65) is kept to be pressed toward said pointed-end projection by an elastic material (64) provided in said concavity.

7. A steam trap operation detector according to any one of claims 1, 2, 3, 4 or 5, in which said diaphragm means for generating ultrasonic vibration owing to said mechanical vibration transmitted from said probe (2) includes a plurality of diaphragms (81 to 84) which are fixed at predetermined intervals in an axial direction of said probe.

8. A steam trap operation detector according to any one of claims 1, 2, 3, 4 or 5, in which said diaphragm (21, 81 to 84) and said ultrasonic microphone (16) are enclosed by a hollow elastic member (34') and one end of said hollow elastic member (34') is attached to a diaphragm mounting member (11), so that said mechanical vibration is transmitted from said probe (2) to said ultrasonic microphone (16) without influence of outside vibratory noise.

9. A steam trap operation detector according to any one of claims 1, 2; 3, 4 or 5, in which said circuit board (20) is attached to a body (5) through an elastic member (93), and terminals of said ultrasonic microphone (16) are flexibly connected to terminals of said circuit board (20) through soft conductive wire (92), so that said mechanical vibration is transmitted from said probe (2) to said ultrasonic microphone (16) without influence of outside vibratory noise.

* * * * *